United States Patent Office 3,560,300
Patented Feb. 2, 1971

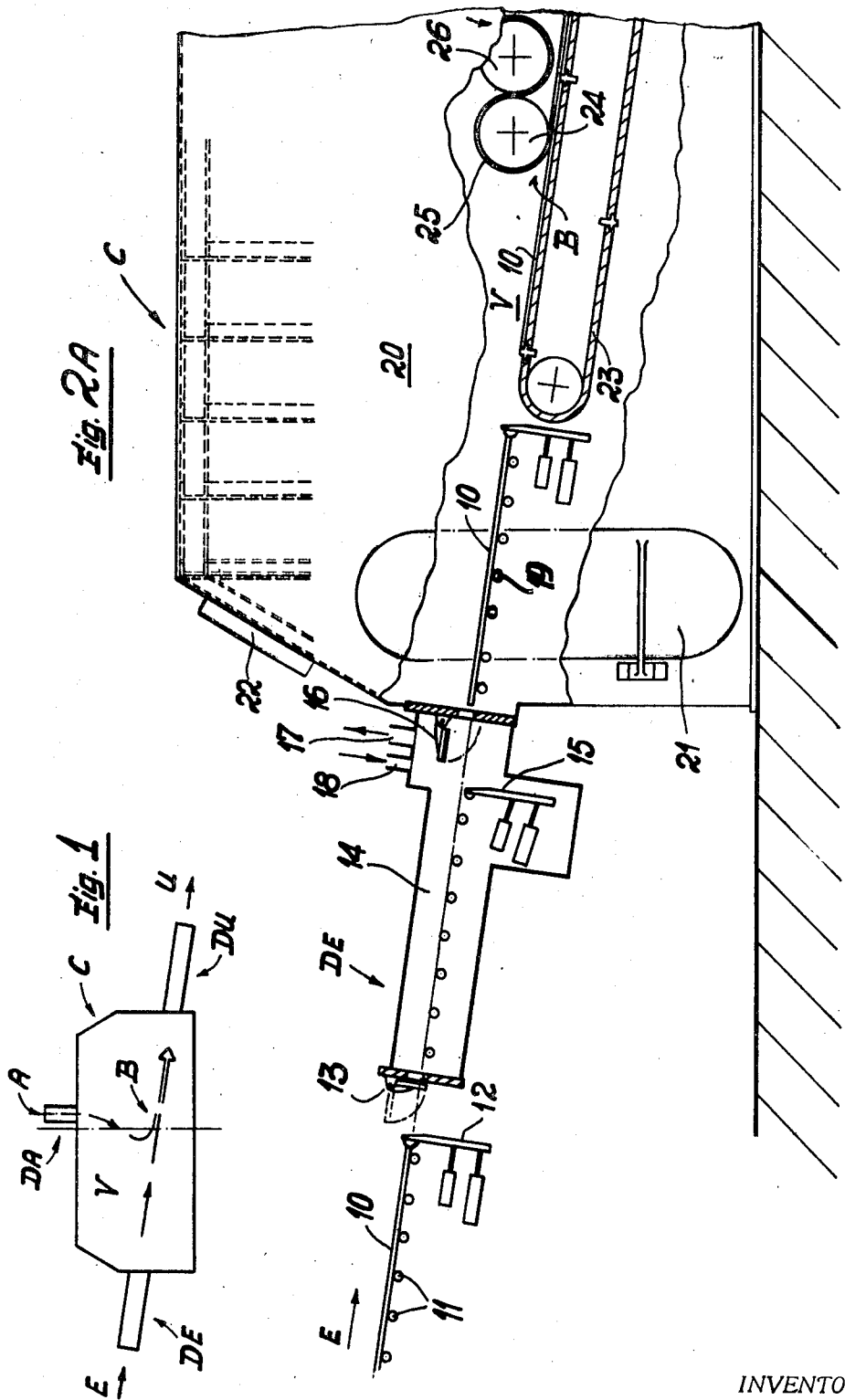

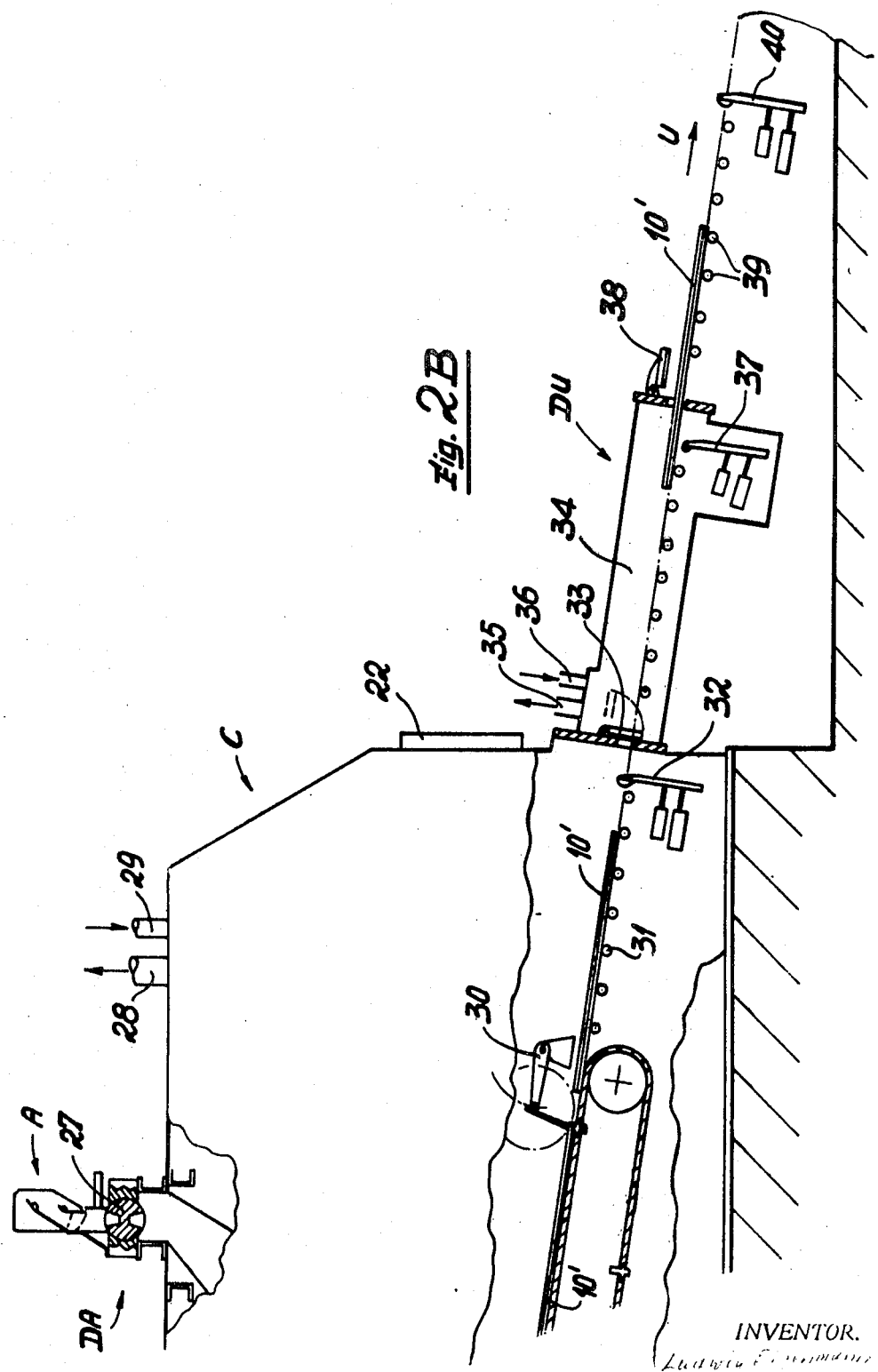

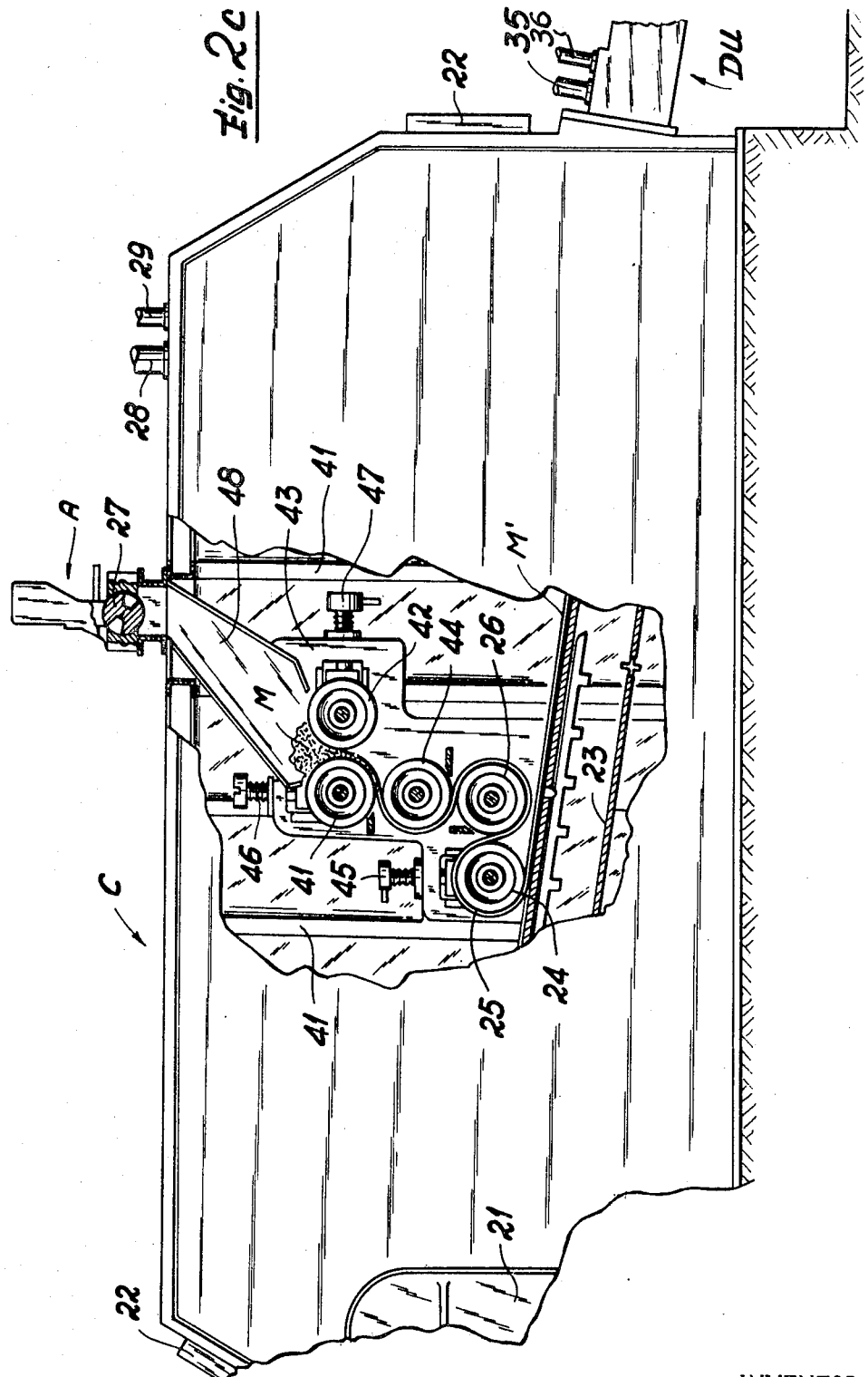

3,560,300
APPARATUS FOR PRODUCING COMPOUND LAMINATES
Ludwig Eigenmann, 2 Via delle Asole, Milan, Italy
Filed Apr. 13, 1966, Ser. No. 542,266
Int. Cl. B29b 1/06
U.S. Cl. 156—382                                        6 Claims

ABSTRACT OF THE DISCLOSURE

An apparatus for producing compound laminates consisting of a support layer and a hard coating film adhering to one face of the layer, in which a film of hardenable material is spread on a smooth upper face of a rigid planar support and a layer of settable conglomerate material applied to the film after hardening of the latter to form, after settling of the layer, the laminate on the support, whereafter the laminate is separated from the support.

---

This invention relates to the manufacture of compound laminates and, more particularly, it relates to a new and advantageous method for providing a planar compound laminar material comprising a relatively thick compound material having a coarse rear face and a very smooth, hard and resisting front face, the said material essentially consisting of a support layer of relatively economical composition, forming the body of the material, and of a thin coating of a high quality composition to provide the said front face. This invention is further related to a new and advantageous apparatus designed for the manufacture of said new laminate.

Compound laminates as above are in demand and may be advantageously used for a plurality of practical purposes. This invention will be hereinafter described with reference to the manufacture of laminates which can be advantageously used for providing slabs and tiles for masonry walls covering in lieu of the well known conventional stoneware or ceramic tiles having a vitreous coating, and adapted to be applied to conventionally plastered wall surfaces, while such application of the invention is not however limitative of the scopes thereof.

The method and the apparatus of the invention are advantageously adapted for the manufacture of a compound laminate consisting of a layer of a conglomerated composition comprising a relatively high amount of a filler and a relatively low amount of a binding agent to provide an essentially economical and coarse body or support of the material, and a polymer-based hard coating providing a hard, smooth and impervious front face.

In particular, it is an object of this invention to provide a new apparatus for producing a material as above and for ensuring that the produced material is provided with the most desirable hard and smooth surface without requiring grinding or otherwise polishing steps on raw or intermediate materials.

A further object of this invention is to provide a new and advantageous apparatus for providing a laminate compound material consisting of a support or body layer and of an hard and smooth coating thereon, wherein the said coating consists of a polymer-based composition requiring for polymerization or setting thereof a temperature higher than the temperature required to set the said layer and even higher than a temperature which might destroy or otherwise damage the said layer.

A still further object of this invention is to provide a new apparatus for the manufacture of laminated compound materials as above, which is noted by high production rate and by the fact that no extended consolidation, setting or weathering steps are required, in particular in comparison with the conventional manufacture of ceramic-based or stoneware articles.

According to the invention, a thin layer of a first composition adapted to lead to formation of a hard film is spread on a rigid temporary support having a planar and very smooth face. Said support may consist of a polished glass sheet, or of a polished stainless steel sheet or other material, provided that such support is rigid enough to ensure planarity of the said smooth face thereof and to resist the heating or other processing steps applied to said thin layer spread thereon. Said thin layer is then processed by heating according to a schedule adapted to provide said hard film on said smooth face of the support. A second conglomerated composition adapted to provide an essentially rigid layer upon setting thereof is then laid on and in the form of a relatively thick layer adherent to said film while said film is still supported by said temporary support and caused to set to provide a rigid layer intimately connected to said film to produce therewith a compound laminated material consisting of said hard film and of said rigid layer. Said compound laminated material is then removed from said temporary support—whereby an article of manufacture consisting of a laminate which is planar (as a result of the planarity of said support), self-supporting and rigid (as comprising the said rigid layer), provided with a hard coating (as comprising the said hard film), and wherein the said coating is smooth (as being formed in juxtaposition with said smooth face of temporary support), is provided.

The said layer of the second conglomerated composition is preferably spread on the said film while in not set or partially set status and while still in essentially pasty or pliable condition, by means of roll spreading or lamination procedures while the said temporary support having the said film on its upper face is progressed below suitable spreading means.

According to the invention, it has been found that the most desirable even adherence between said film and said layer is provided when no gaseous bubbles or occlusions are retained between said film and the said layer spread or laid thereon. A further object of this invention is therefore to provide a new and advantageous apparatus comprising an enclosure or confinement wherein a substantial vacuum is provided and maintained, and wherein means are arranged for laying said layer on said film within said confinement.

According to a preferred embodiment of the invention, the apparatus comprises an enclosure wherein means are arranged for progressing temporary support means having said film formed thereon along a given path from an inlet passage to an outlet passage of said enclosure, and wherein layer spreading means are also arranged for spreading said layer on said film at a location of said path, and comprising air trap means at said inlet and outlet passages and at a further passage wherethrough the said conglomerate composition may be supplied to said layer spreading means, whereby said compound laminate material may be continuously produced by progressing said temporary support means along said path within said enclosure, by spreading said layer on the film supported by said support means, and by removing said support means from said enclosure for further processing of the superimposed film and layer on said support means.

These and other objects and advantages of the present invention will be shown in the following detailed description of a preferred embodiment thereof illustrated in the accompanying drawings in which:

FIG. 1 is a diagrammatical showing of an apparatus arranged and operating according to this invention;

FIGS. 2A and 2B are schematic elevation views of the inlet and respectively of the outlet end portions of the apparatus, parts of the enclosure thereof being broken away for better showing of certain components of said apparatus; and FIG. 2C is a fragmentary side view of the center and outlet portion of said apparatus, part of the enclosure side wall being broken away to illustrate the layer-spreading device arranged thereinto.

Referring first to FIG. 1, there is diagrammatically shown an equipment including an atmospheric pressure resisting enclosure generally indicated at C, wherein a vacuum V may be formed and maintained by conventionally constructed, operated and connected air exhausting means (not shown), said enclosure having opposite end portions to which an inlet device DE and an outlet device DU are provided for passage of said support means from E to U along said enclosure, while the vacuum is maintained in said enclosure. At a location B in the path between inlet at E and outlet at U a layer of suitable conglomerated composition, fed at A by a feeding device generally indicated at DA, is spread on the film supported on the upper face of each support means sequentially fed and progressed from inlet E to outlet U into and along said enclosure, under substantial exhausted conditions.

Referring now to FIGS. 2A to 2C inclusive, the said temporary support means there are generally indicated at 10, and the same means are indicated at 10′ where the compound laminated material is supported thereon. Said means 10 are formed by flat, rigid plates of suitable material, such as stainless steel, glass, ceramics and so on, and have a polished planar upper face. A compound material may be used for providing the said temporary support means 10, such as a metallic plate having a glassy or ceramic coating thereon. No detailed showing or further discussion of said means is believed to be necessary about said support means, as the structure thereof may be readily conceived by those skilled in the art.

Means for sequentially driving components in and off an exhausted enclosure are known and said inlet and outlet devices DE and DU, respectively, are provided with a suitable type of such means. An example of said means is diagrammatically shown in FIGS. 2A and 2B.

The path of the support means from inlet E to outlet U is preferably downwardly sloping. Therefore each support means or plate 10 can be caused to downwardly run over idle supporting rollers 11 (FIG. 2A) until abutment on a stop 12. Such stop member may be pneumatically or electrically operated in phased relationship with the components of the inlet device DE, having a similarly operated inlet door 13, a confined inner space 14 longer than each individual supporting means, a similarly phasedly operated stop device 15 thereinto, and an outlet door 16 through which a passage between said space 14 and the exhausted space V inside the enclosure C is phasedly formed. The said space 14 is further connected via passages 17 and 18 with an exhausting pump and respectively with the outer atmosphere. Remotely controlled valves (not shown) of conventional construction are provided at said passages 17 and 18.

The above indicated stop means, doors and valves are controlledly and phasedly operated by conventionally constructed devices (not shown), adjusted to provide the following sequence:

Assuming that one plate support 10 has been driven inside the exhausted interior V of enclosure C, the door 16 is closed and the space 14 is caused to communicate with the external atmosphere via passage 18, whereby atmospheric pressure is restored within said space; the inlet door 13 is then caused to open and the stop member 12 is removed from downwardly sloping path of the supporting plates 10, whereby one plate 10 is caused to run on siad idle rollers 11 and enter in said space 14 until abutment on said stop member 15 thereinto.

The said door 13 and the said passage 18 are caused to close and then, upon opening of passage 17, the air is sucked off from the space 14 until substantial exhaustion thereof; then the door 16 is opened again, the stop member 15 is removed from the path of the support plates so that the said plate is admitted to enter in the enclosure, without noticeable drop of the exhaustion of the confined space V within said enclosure C.

It is evident that, while the above steps are being performed, another support plate 10 will be located upstream of inlet device DE, on the idle rollers 11 and in abutting relationship with the stop member 12, which has been restored in its operative position, as shown.

Each support plate 10 driven in the enclosure, and resting on idle rollers 19, for example, is then caused to sequentially progress over conveyor means, such as a conveyor belt 23, for example, to pass in the location B wherein a layer 25 of conglomerate composition is progressively spread on the film supported by said plate. The spreading device will be described in detail with reference to FIG. 2C.

Referring now to FIG. 2B, there is shown a plurality of support plates 10′ provided with the said conglomerate layer thereon, that is carrying the desired compound laminate material. Each material carrying plate 10′, upon sequential operation of a stop member 30, is caused to be sequentially transferred on idle rollers 31 until abutment on a stop member 32 and then, upon opening of a door 33, transferred within the confined space 34 within the outlet device DU. Such outlet device is essentially similar to the above described inlet DE of FIG. 2A, and it is provided with valve controlled passages 35 and 36 for exhaustion and respectively for restoring atmospheric pressure thereinto, with a remote controlled stop member 37 and with a door 38 for phasedly providing a passage through which the plates 10′ can be driven off in direction U out of the apparatus, on idle rollers 39 and against a stop member 40. The sequential operation of the said doors, stop members and of the valves (not shown) controlling said passages 35 and 36, corresponds to the above discussed sequence of the components of the inlet device DE, and therefore no further description is believed necessary, as it will be evident that said support plates may be sequentially driven off said apparatus without affecting the exhausted condition within the said enclosure C.

It is further believed to be evident to those skilled in the art that the above described combination and arrangement of means may be modified without departing from the spirit and the scope of the invention. For example, instead of providing a downwardly sloping path and idle support means for allowing the plates to downwardly run thereon, a plurality of motor driven conveyor belts or the like may be provided and phasedly actuated step-by-step. Alternatively pusher means may be provided to ensure the sequential transference of the individual plates or even of grouped pluralities of plates inside and outside the exhausted confinement V within the enclosure C.

As more detailedly shown in FIGS. 2A and 2C, the said enclosure C is constructed in the form of a sturdy box-like structure 20 (FIG. 2A) suitably framed at 41 (FIG. 2C) to resist to atmospheric pressure. A pressure resisting and air-tight door 21 is provided for entrance in the enclosure for inspection, repair and maintenance purposes, and pressure resisting windows 22 are provided for visually controlling the operation of the apparatus while the interior of enclosure C is exhausted. Passages 28 and 29 are provided to connect, upon actuation of conventionally constructed valves (not shown) the interior of said enclosure with a source of vacuum and respectively with the outer atmosphere. Suitable instrumentation, such as pressure indicators, thermometers and so on are provided to control the inside of said enclosure, and suitable warning and safety devices may be conventionally provided and connected for proper operation of the apparatus.

A preferred embodiment of the conglomerate material spreading device is shown in FIG. 2C. Such device comprises a feeding component A provided with an outer hopper and with a grooved rotary roller 27 to meteredly feed the composition into a chute 48 inside the exhausted enclosure C, without affecting the exhaustion thereof. The said material in amorphous state, such as indicated at M, is fed and calendered between counter-rotating motor driven rollers 41 and 42 supported by a suitable framing 43 and then the resulting layer is further progressed and laminated until the desired thickness by further motor driven rollers 44 and 26 until a spreading roller 24 spreads the desired layer 25 of conglomerated material on the film covered upper face of the support plates which are concurrently progressed therebeneath on the said conveyor belt 23, as described above.

The said device is provided with suitably and conventionally arranged motor and transmission means for driving the said rollers and conveyor belt. Adjusting means such as indicated at 45, 46 and 47 are provided for adjusting the clearance between said rollers and for exactly metering the thickness of the applied layer.

In general, the said rollers and the said conveyor belt are continuously driven at constant speed and the said support plates are progressed through the spreading device in end-to-end adjacent relationship so that a continuous and uniform layer is spread thereon, the feeding of the support plates within the apparatus being phased and timed to provide said relationship. In addition, the linear speed of said conveyor belt 23 is generally equal to the peripherical speed of spreading roller 24, but, if desirable or expedient, a somewhat difference between said speeds may be provided for better juxtaposition and full adherence of the spread layer of the conglomerate material on the film supported on the progressed support plates.

From what above and upon a consideration of the accompanying drawings it will be evident to those skilled in the art that the invention provides a new and unobvious method for producing a compound material, wherein two laminated components may be brought into full, intimate and evenly complete adherence without any air trapping between the juxtaposed strata, therefore preventing the occurrence of formation of gaseous bubbles between the components of compound laminated material to be manufactured. In addition, the maintainment of a substantial vacuum inside the said enclosure C advantageously causes the elimination of gaseous matter which may be present or formed in the components, namely of the conglomerate material, before its juxtaposition to the associated film, thus preventing such other possible cause of bubble formation.

The new method for producing the considered compound planar material, consisting of a hard coating film adhering to one face of a support layer, may therefore comprise the following steps:

(a) spreading a film of hardenable material on the upper and preferably highly polished planar face of a support plate as above;

(b) causing said film to harden on said face. Said hardening may be provided by proper heat processing adapted to cause said hardenable material to polymerize or otherwise set;

(c) progressing said support plate carrying said hardened film on said upper face thereof into and through an apparatus essentially as above described, whilst ($c_1$)— a settable conglomerated material is meteredly fed into said apparatus, laminated in layer form and brought in juxtaposition to said film, and ($c_2$) causing said layer and said film to fully and intimately adhere to each other while concurrently progressed and contacted in said apparatus;

(d) driving said support plate having said juxtaposed and adherent film and layer thereon outside said apparatus;

(e) causing said settable conglomerated material to set in said layer form adherent to said film to provide said support layer having said film adhering to one of its faces. Said setting may be provided by heating, for example, at a temperature well below than the temperature at which said film has been caused to harden;

(f) removing the laminar compound material consisting of said hardened film and said set support layer from said support plate.

It is evident that the compound material thereby produced will be provided with a film coated face having the smoothness of the upper face of the support plate whereon it has been formed. For example, compound material having a perfect glossy surface may be manufactured by making use of support plates having corresponding glossy upper face.

Said hard film may be substantially produced as a lacquer coating covering one face of the support layer. Therefore, the said hardenable material may consist of a plurality of hardenable and/or polymerizable substance or compound which, as individually considered, are known in the art and available as a lacquer. For example, such hardenable material may consist of a synthetic lacquer, or of a polyurethane compound, or of a polyester compound, or of an acrylic compound, or of an epoxy lacquer, and so on.

The said settable conglomerate material used for providing the said support layer may meet several requirements both in view of its mechanical resistance, its ability to be applied to a plastered masonry wall, and its economy. Essentially, said conglomerated material include a settable binder component and an inert filler component, said latter component being preferably in amount greater than the binder. Its binder component will preferably but not necessarily have an affinity with the film forming hardenable material for proper adherence and firm connection of said layer and film to each other. In the case that the binder of the support layer as not or has a defective affinity with said hardenable material, an intermediate thin layer of a material having affinity with both said binder and said film forming component may be applied to said film prior laying of said conglomerated material thereon.

For example, a monomeric material cosolvent of both said binder and the film forming material may be applied to said film prior laying of said conglomerated material on said film, to ensure the required firm and permanent bond therebetween.

The formation of said hard film has been generally indicated above as generally consisting in the steps of laying a film of hardenable material on said support plate and of causing hardening thereof. It is however evident that such formation may be adapted to various requirement and desirable properties of the hard coating of the article of manufacture to be produced.

For example, the said film may be, if desired or expedient, may by spreading on the smooth and preferably glossy upper face of the support plate a first film of essentially transparent and polymerizable material and then a second film of pigmented similar material, whereby a glossy translucent coating is formed on the article of manufacture. As the said coating has both a protective and an ornamental purpose, the pigmented film may be spread according to a decorative pattern and/or include differingly colored pigments and so on. In addition, over a clear or colored transparent film a decorative sheet material, such as print paper and so on, may be applied prior of spreading the said conglomerate layer, suitable binders being provided for ensuring the firm bond of said sheet material with the said film and layer therebetween said sheet material is sandwiched.

The said hardenable film forming material and the said settable support layer forming conglomerate material may be compounded according to the art.

It is evident that several modifications and adaptations may be resorted by those skilled in the art, without departing from the spirit and the scope of this invention,

I claim:

1. An apparatus for the manufacture of hard, planar compound material having a filler as its major component and a hard surface comprising, in combination:
   (a) planar rigid support means having an upper support face;
   (b) an atmospheric pressure resisting airtight enclosure wherein a low barometric pressure can be maintained;
   (c) conveyor means to progress said support means through said enclosure while said low pressure is maintained; and
   (d) means within said enclosure for laying a relatively thick layer of conglomerated material having a filler as its major component on a film of material previously laid on said support means as said support means are progressed in said enclosure under low barometric pressure to prevent entrapping of gaseous bubbles at the interface between said film and said layer.

2. In the apparatus of claim 1, means to supply said conglomerated material in said enclosure as said low barometric pressure is maintained thereinto.

3. In the apparatus of claim 1, support means inlet and outlet means at opposite locations of said enclosure, said inlet and outlet means including air-trapping means to provide passage of said support means in and off said enclosure while said low barometric pressure is maintained thereinto.

4. In the apparatus of claim 1, roller means to lay said conglomerated material in said enclosure, and endless conveyor means for continuously progressing said support means inside said enclosure, first downwardly sloping slide means aligned and flush with the inlet end of said conveyor, second downwardly sloping slide means aligned and flush with the outlet end of same conveyor, both said slide means being partially internal and partially external to said enclosure, and air trap means enclosing intermediate portions of both slide means for sliding passage of said rigid support means therealong towards and respectively away from said conveyor while the said low barometric pressure is maintained within said enclosure.

5. The apparatus of claim 4, wherein said air trap means consist of tubular passageway forming airtight channels each having a fore wall and a rear wall, door means in one of said walls for passage of individual support means between outside and inside said passageways, door means in the other of said walls for passage of same support means between inside of said passageways and inside of said enclosure, and actuator means for alternatively opening and closing said door means in said one and respectively said other walls to prevent direct air communication between outside and the inside of said enclosure while said support means travel from inside to outside of said passageways.

6. The apparatus of claim 1, wherein said conglomerated material laying means comprises roller means including material metering and laminating rollers and a spreading roller, said latter roller being located above and adjacent to the upper face of said film as progressed below said spreading roller on said support mean to spread on and apply said material in layer form to said film.

References Cited
UNITED STATES PATENTS

| | | | |
|---|---|---|---|
| 3,206,323 | 9/1965 | Miller et al | 117—119X |
| 3,328,499 | 6/1967 | Barnette | 161—5UX |
| 1,850,995 | 3/1932 | Dalton | 161—5X |
| 2,541,478 | 2/1951 | Nadeau et al. | 156—307X |
| 2,817,619 | 12/1957 | Bickel et al. | 156—245X |
| 2,979,780 | 4/1961 | Gittins | 156—305X |
| 3,098,262 | 7/1963 | Wisotzky | 156—245X |
| 3,384,522 | 5/1968 | Rubenstein | 156—246X |
| 3,265,525 | 8/1966 | Lichte | 118—50.1X |

JOHN T. GOOLKASIAN, Primary Examiner

G. W. MOXON II, Assistant Examiner

U.S. Cl. X.R.

117—119; 118—50; 156—246, 286, 500, 501; 264—102